United States Patent [19]

Regan

[11] 4,311,775
[45] Jan. 19, 1982

[54] NOVEL PHTHALOCYANINE PIGMENTS AND ELECTROPHOTOGRAPHIC USES THEREOF

[75] Inventor: Michael T. Regan, Fairport, N.Y.

[73] Assignee: Eastman Kodak Company, Rochester, N.Y.

[21] Appl. No.: 194,200

[22] Filed: Oct. 6, 1980

[51] Int. Cl.³ .......................... G03G 5/04; G03G 9/00
[52] U.S. Cl. ........................................ 430/37; 430/39; 430/46; 430/78; 430/106; 430/119; 430/120
[58] Field of Search ...................... 430/78, 106, 37, 46

[56] References Cited

U.S. PATENT DOCUMENTS

| | | | |
|---|---|---|---|
| 3,932,454 | 1/1976 | Luebbe, Jr. ................. | 430/78 X |
| 4,142,890 | 3/1979 | Bloom et al. ................. | 430/78 |
| 4,256,819 | 3/1981 | Webster et al. ................ | 430/78 X |

Primary Examiner—John D. Welsh
Attorney, Agent, or Firm—Torger N. Dahl

[57] ABSTRACT

Novel phthalocyanine pigments having the structure:

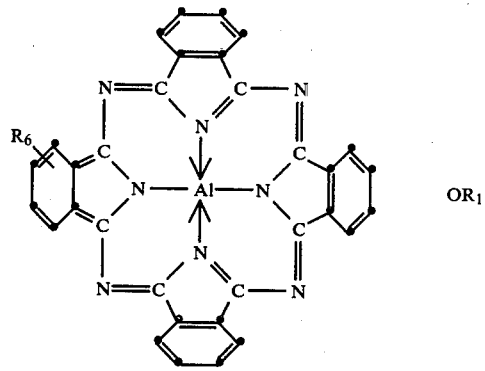

I.

wherein:
$R_1$ represents

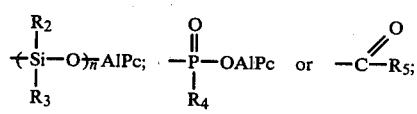

$n$ represents 1, 2, 3 or any combination of 1, 2 and 3.
$R_2$, $R_3$, $R_4$ and $R_5$ represent alkyl, alkylaryl, alkoxy, alkoxyaryl, cycloalkyl, aryl, aralkyl or aryloxy;
$R_6$ represents hydrogen or chlorine and AlPc represents

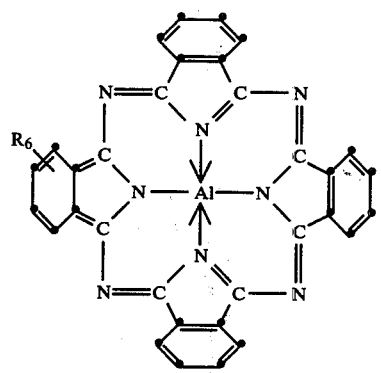

II.

are useful in electrographic developers and photoelectrophoretic imaging materials and processes.

22 Claims, 3 Drawing Figures

NOVEL PHTHALOCYANINE PIGMENTS AND ELECTROPHOTOGRAPHIC USES THEREOF

FIELD OF THE INVENTION

This invention relates to novel phthalocyanine pigments and to their utility in electrographic developers and photoelectrophoretic imaging processes.

BACKGROUND OF THE INVENTION

In the past, there has been extensive description in the patent and other technical literature of electrographic developers and photoelectrophoretic imaging processes.

Descriptions of photoelectrophoretic imaging processes are contained in U.S. Pat. Nos. 2,758,939 by Sugarman issued Aug. 14, 1956; 2,940,847, 3,100,426, 3,140,175, 3,143,508, 3,384,565, 3,384,488, 3,615,558, 3,384,566, 3,383,993, and 3,976,485. In each of the foregoing photoelectrophoretic imaging processes an imaging layer comprising electrically photosensitive material is subjected to the influence of an electric field and exposed to an image pattern of electromagnetic radiation to which the electrically photosensitive material is sensitive. The electrically photosensitive material is caused to migrate imagewise in the layer to form a record of the imaging electromagnetic radiation.

Electrophotographic processes using electrographic developers are described in U.S. Pat. Nos. 2,221,776, issued Nov. 19, 1940; 2,277,013, issued Mar. 17, 1942; 2,297,691, issued Oct. 6, 1942; 2,357,809, issued Sept. 12, 1944; 2,551,582, issued May 8, 1951; 2,825,814, issued Mar. 4, 1958; 2,833,648, issued May 6, 1958; 3,220,324, issued Nov. 30, 1965; 3,220,831, issued Nov. 30, 1965; 3,220,833, issued Nov. 30, 1965; any many others. Generally these processes have in common the steps of forming a electrostatic charge image on an insulating electrographic element. The electrostatic charge image is then rendered visible by treatment with an electrographic developer.

Generally electrographic developers include a toner which is electrostatically attractable to the charge image. The toner in electrographic imaging is usually a particulate polymeric material containing a colorant such as a pigment for viewing purposes.

In color electrophotographic and color photoelectrophoretic imaging it is important that the pigments used have the proper light absorption characteristics. Thus, a cyan pigment should have a high absorption of red light (about 600–700 nm) and very low absorption of green light (about 500–600 nm). Many cyan pigments such as copper phthalocyanine, do not possess these absorption characteristics to the desired extent.

Making a cyan pigment having the desired absorption characteristics is difficult. Indeed, Andre Pugin states in the *Official Digest*, Vol. 37, page 782, July, 1965, that there is no known relationship between chemical modification of a crystalline material, such as a pigment, and its color and other properties.

SUMMARY OF THE INVENTION

The present invention provides novel electrically photosensitive phthalocyanine pigments which are useful in electrographic developers and photoelectrophoretic imaging processes. They are also useful in paints, inks and other materials in which a cyan colorant is desired. The pigments have the general structure:

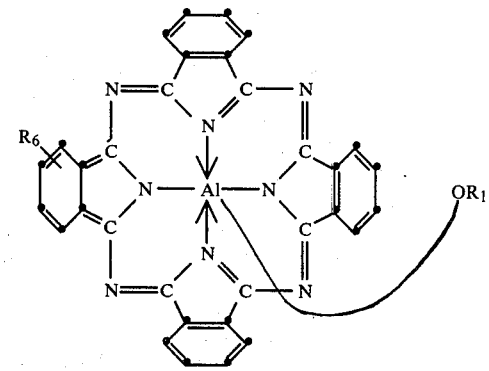

wherein:
$R_1$ represents

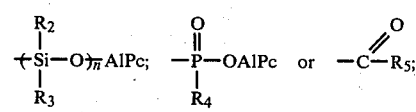

n represents 1, 2, 3 or any combination of 1, 2 and 3.
$R_2$, $R_3$, $R_4$ and $R_5$ represent alkyl, alkylaryl, alkoxy, alkoxyaryl, cycloalkyl, aryl, aralkyl or aryloxy;
$R_6$ represents hydrogen or chlorine and
AlPc represents

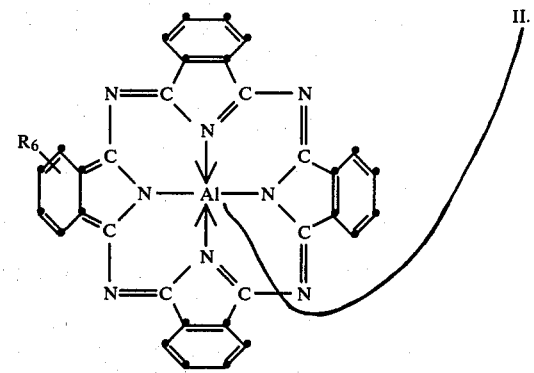

In Formula I, alkyl and alkoxy, whether used as a suffix or a prefix, contain from 1 to 5 carbon atoms. Aryl and Ar, whether used as a suffix or a prefix, include phenyl and naphthyl.

The pigments of Formula I exhibit significantly less absorption in the green portion of the visible spectrum than other cyan colorants such as copper phthalocyanine. They also exhibit good to excellent color stability compared to many other cyan colorants. Formula I pigments are electrically photosensitive, in that when placed between two electrodes in an insulating medium, subjected to an electric field and activating radiation, they will migrate to at least one of the two electrodes.

Electrographic toners and electrically photosensitive materials prepared from the pigments of Formula I are particularly useful in electrophotographic and photoelectrophoretic imaging processes wherein a cyan image is desirable.

The present invention also provides an electrographic developer comprising a toner which contains a resin and pigment according to Formula I.

The present invention also provides a photoelectrophoretic image recording method comprising the steps of:

(a) placing an imaging element comprising a layer of an electrically photosensitive imaging material comprising an electrically photosensitive phthalocyanine pigment according to Formula I in an electric field;

(b) exposing said element to an image pattern of electromagnetic radiation to which said electrically photosensitive layer is photosensitive, to form a record of the image pattern of electromagnetic radiation in said layer.

If the layer is solid it can be at least partially liquified before, during or after exposure and/or application of the electric field to facilitate migration of said electrically photosensitive material in said layer. Means for achieving at least partial liquification will be described hereinafter.

The present invention also provides an electrographic imaging process wherein a visible image is developed on a substrate by depositing toners, comprising a pigment according to Formula I, on a charge pattern on the substrate.

FIGS. 1, 2 and 3 illustrate the absorption spectrum of three (3) pigments according to Formula I compared to copper phthalocyanine.

DESCRIPTION OF THE PREFERRED EMBODIMENT

Figure 1:
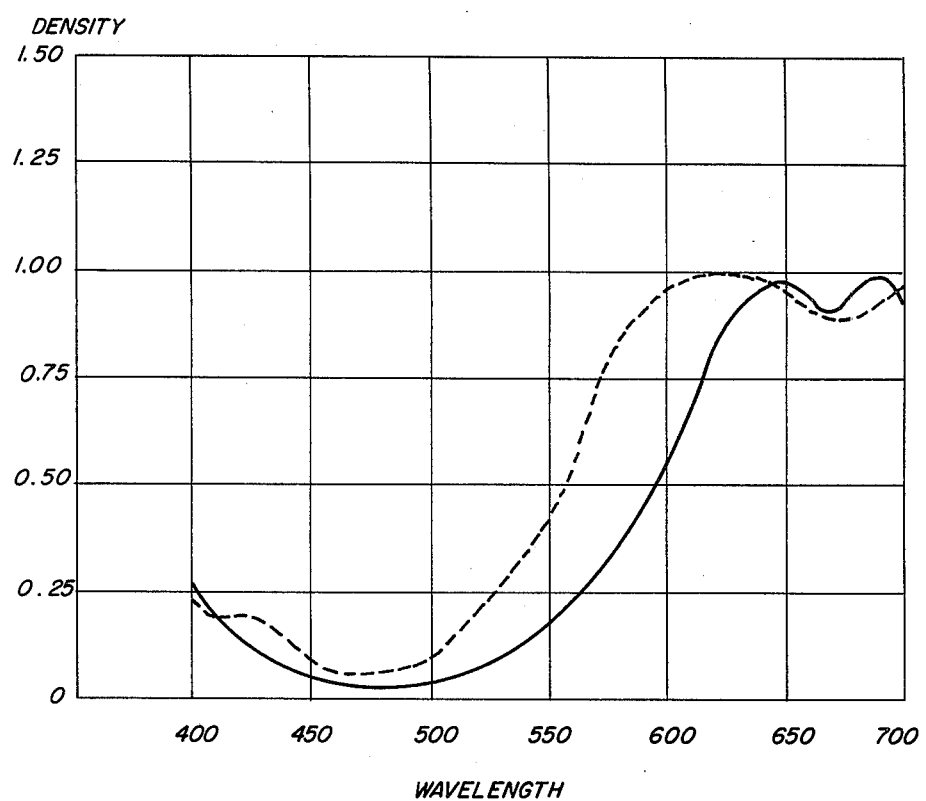

A preferred embodiment of the present invention provides electrically photosensitive phthalocyanine pigment having the structure of Formula I wherein:

$R_2$, $R_3$, $R_4$ and $R_5$ represent phenyl, methoxyphenyl, methylphenyl, benzyl, cyclohexyl or methyl.

DETAILED DESCRIPTION OF THE INVENTION

All of the novel pigments of this invention are prepared according to the same general procedure. Examples of the synthesis of several of the novel pigments are presented below.

Synthesis of bis(phthalocyanylalumino)tetraphenyldisiloxane pigment (Pigment 1, Table I):

Three gm of hydroxylaluminumphthalocyanine, 1.4 gm of diphenyldichlorosilane, 50 ml of pyridine and 4 ml of water were admixed in a 100 ml 3 neck round bottom flask. The flask was fitted with a mechanical stirrer, a condenser having a nitrogen inlet and stopper. The mixture was heated at reflux temperature for about 5 hours, stirring continuously. The mixture was then filtered while hot through a medium porosity sintered glass funnel. The bis(phthalocyanylaluminum)tetraphenyldisiloxane was washed with 500 ml of acetone and then dried overnight at 114° C. Yield was 2.4 gm.

Synthesis of chlorophthalocyanaluminumacetate (Pigment 7, Table I) was carried out as above except the refluxed mixture consisted of 7.5 gm of hydroxylaluminumphthalocyanine in 250 ml of acetic anhydride. Refluxing was carried out for 24 hours.

Synthesis of bis(phthalocyanylaluminum)phenylphosphonate (Pigment 3, Table I) was carried out according to the synthesis of Pigment 1 above except 0.42 gm of phenylphosphonic acid was used instead of the diphenyldichlorosilane, the pyridine was anhydrous and the water was omitted.

The other novel pigments of this invention were prepared similarly. Table I is a partial listing of representative pigments included in Formula I.

TABLE I

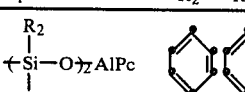

| No. | $R_1$ | $R_2$ | $R_3$ | $R_4$ | $R_5$ | $R_6$ |
|-----|-------|-------|-------|-------|-------|-------|
| 1. | $\begin{array}{c}R_2\\|\\{+}Si{-}O{\tfrac{}{}}_{2}AlPc\\|\\R_3\end{array}$ | phenyl | phenyl | — | — | H |
| 2. | $\begin{array}{c}O\\\|\\-P-OAlPc\\\|\\R_4\end{array}$ | — | — | phenyl | — | H |
| 3. | $\begin{array}{c}O\\\|\\-P-OAlPc\\\|\\R_4\end{array}$ | — | — | methoxyphenyl | — | H |
| 4. | $\begin{array}{c}O\\\|\\-P-OAlPc\\\|\\R_4\end{array}$ | — | — | $CH_3$ | — | H |
| 5. | $\begin{array}{c}O\\\|\\-P-OAlPc\\\|\\R_4\end{array}$ | — | — | methylphenyl(-CH$_2$-) | — | H |
| 6. | $\begin{array}{c}O\\\|\\-P-OAlPc\\\|\\R_4\end{array}$ | — | — | thiacyclohexyl | — | H |
| 7. | $-C\overset{O}{\diagup}\!R_5$ | — | — | — | $CH_3$— | Cl |

The pigments of Formula I are useful as excellent toner colorants and in all electrically photosensitive materials, imaging layers and photoelectrophoretic imaging processes which require the combined action of an electric field and exposure to an image pattern of electromagnetic radiation to obtain an image. Formula I materials are also useful in imaging processes such as those described in U.S. Pat. Nos. 3,520,681; 3,770,430; 3,795,195; 4,013,462; 3,707,368; 3,692,576 and 3,756,812, all relating to manifold imaging or photoelectrosolography.

The electrically photosensitive material of this invention comprises at least one electrically photosensitive pigment according to Formula I. In addition, the electrically photosensitive material may also include at least one of the following addenda: liquid or liquefiable electrically insulating carrier, a charge control agent, chemical or spectral sensitizers, and additional colorants (dyes or pigments) which may or may not be electrically photosensitive. Other addenda necessary to change or enhance the properties of the material may also be included. The electrically photosensitive material may be in the form of a suspension, dispersion, or liquid or liquefiable layers.

In one photoelectrophoretic imaging process an element comprising a conductive support, or a support having a conductive layer, in electrical contact with a liquified or partially liquified imaging layer of electrically photosensitive material is imaged in the following manner. An electrostatic charge pattern is formed on the imaging layer, for example, by uniformly electrostatically charging the layer and then exposing it to an image pattern of activating electromagnetic radiation. The electrically photosensitive pigments in the imaging layer which have been exposed to radiation migrate through the imaging layer leaving an undeveloped image record of the charge pattern on the conductive substrate. This image is developed by submerging the element in a solvent which removes or dissolves the exposed, or the unexposed portions of the imaging layer.

In another such process, a liquid or at least a partially liquid electrically photosensitive imaging layer is positioned between two spaced electrodes. While so positioned between two spaced electrodes, the imaging layer is subjected to an electric field and exposed to an image pattern of activating radiation. As a consequence, the charge-bearing, electrically photosensitive pigments in the imaging layer migrate to one or the other of the electrode surfaces to form on at least one of the electrodes an image record representing a positive-sense or negative-sense image of the original image pattern. The image record is developed by separation of the electrodes. In this process the layer of electrically photosensitive material may be sandwiched between two support sheets to form an imaging element. After application of the field and exposure, a visual record of the image pattern is developed on at least one of the two sheets by separation of the sheets. The support sheets may be electrodes. Or electrodes may be directly attached to the back surfaces of the support sheets. Alternatively, one or both of the support sheets may be made of a conductive material. In some embodiments, at least one of the sheets is transparent so as to permit exposure of the imaging layer.

In each of the foregoing processes, the imaging layer of electrically photosensitive material is, or can be rendered, at least partially liquid. The phrase partially liquid is used herein to mean that the cohesive forces of the materials forming the layer are sufficiently weak, or weakened, to permit some imagewise migration of the electrically photosensitive material, under the combined influence of exposure to activating electromagnetic radiation and an electric field, in the layer of electrically photosensitive material.

In general, imaging layers which are not at least partially liquid may be rendered at least partially liquid by treatment with, for example, heat, a solvent and/or solvent vapors before, during or after the exposure to an image pattern of electromagnetic radiation and application of an electric field. Good results are obtained if the layer is liquefied subsequent to the exposure and field application steps. In the latter situation, the imaging layer is liquefied in the presence of an electric field and the image is developed according to one of the techniques previously mentioned herein.

The extent to which the electrically photosensitive materials migrate in those imaging layers, which must be liquefied, can be controlled by varying the strength and duration of the electric field, the intensity and duration of the exposure and the time which the imaging layer is exposed to a particular liquefying medium such as heat and/or solvent. For example, if the imaging layer is only slightly liquefied, the electrically photosensitive material will migrate only slightly, thus forming an underdeveloped image record. This image layer, containing the underdeveloped image record, can be stored and developed more fully at a later date. This delayed development can be carried out simply by placing the underdeveloped image layer in an electric field and then liquefying the layer sufficiently to allow the exposed electrically photosensitive material to resume migration. Development of the visual record of the image pattern is then carried out according to one of the above mentioned techniques.

The electrically photosensitive material of this invention in general comprises a Formula I electrically photosensitive pigment dispersed in an electrically insulating carrier material such as an electrically insulating liquid, or an electrically insulating, liquefiable matrix material, such as a heat and/or solvent liquefiable polymeric material or a thixotropic polymeric material.

Generally, the electrically photosensitive material of this invention will comprise from about 0.05 part to about 2.0 parts of electrically photosensitive pigment for each 10 parts by weight of electrically insulating carrier material.

Useful liquefiable electrically insulating carriers are disclosed in aforementioned U.S. Pat. Nos. 3,520,681; 3,975,195; 4,013,462; 3,707,368; 3,692,516 and 3,756,812. The carrier can comprise an electrically insulating liquid such as decane, paraffin, Sohio Odorless Solvent 3440 (a kerosene fraction marketed by the Standard Oil Company, Ohio), various isoparaffinic hydrocarbon liquids, such as those sold under the trademark Isopar G by Exxon Corporation and having a boiling point in the range of 145° C. to 186° C., various halogenated hydrocarbons such as carbon tetrachloride, trichloromonofluoromethane, and the like, various alkylated aromatic hydrocarbon liquids such as the alkylated benzenes, for example, xylenes, and other alkylated aromatic hydrocarbons such as are described in U.S. Pat. No. 2,899,335. An example of one such useful alkylated aromatic hydrocarbon liquid which is commercially available in Solvesso 100 sold by Exxon Corporation. Solvesso 100 has a boiling point in the range of about 157° C. to about 177° C. and contains 98% by volume of $C_8$ to $C_{12}$ aromatics. Typically, whether solid or liquid at normal room temperatures, i.e., about 22° C., the electrically insulating carrier used in the present invention has a resistivity greater than about $10^9$ ohm-cm, preferably greater than about $10^{12}$ ohm-cm.

In general, electrically photosensitive material useful in photoelectrophoretic imaging layers and processes according to this invention, comprise particles having an average particle size within the range of from about 0.01 micron to about 20 microns, preferably from about 0.01 to about 5 microns. Generally, these particles are composed of one or more colorants and/or electrically photosensitive colorants, including the colorants of Formula I.

As stated hereinbefore, the electrically photosensitive materials may also contain various nonphotosensitive materials such as electrically insulating polymers, charge control agents, various organic and inorganic fillers, as well as various additional dyes or pigment materials to change or enhance various colorant and physical properties of the electrically photosensitive particle. Such electrically photosensitive materials may also contain other photosensitive materials such as various sensitizing dyes and/or chemical sensitizers to alter or enhance their response characteristics to activating radiation.

The Formula I pigments may also be combined with polymers containing organic photoconductive repeating units to form electrically photosensitive composite particles. Useful polymers are disclosed in Item 19014, "Composite Electrically Photosensitive Particles", *Research Disclosure*, Volume 190, published February, 1980.

Charge control agents may be incorporated to improve the uniformity of charge polarity of the electrically photosensitive materials. Charge control agents are typically polymeric materials incorporated in the electrically photosensitive materials by admixture thereof into the carrier. In addition to, and possibly related to, the aforementioned enhancement of uniform charge polarity, the charge control agents often provide more stable suspensions, i.e., suspensions which exhibit substantially less settling out of the dispersed photosensitive particles.

Illustrative charge control agents include those disclosed in copending U.S. Patent Patent 4,219,614 by Stahly. The polymeric charge control agents disclosed therein comprise a copolymer having at least two different repeating units, (a) one of said units being present in an amount of at least about $0.5 \times 10^{-4}$ moles/gram of said copolymer and being derived from monomers selected from the group consisting of metal salts of sulfoalkyl acrylates and methacrylates and metal salts of acrylic and methacrylic acids, and (b) one of said repeating units being derived from monomers soluble in the carrier and present in an amount sufficient to render said copolymer soluble in the carrier material.

Examples of such copolymers are poly(vinyltoluene-co-lauryl methacrylate-co-lithium methacrylate-co-methacrylic acid), poly(styrene-co-lauryl methacrylate-co-lithium sulfoethyl methacrylate), poly(vinyltoluene-co-lauryl methacrylate-co-lithium methacrylate), poly(t-butylstyrene-co-lauryl methacrylate-co-lithium methacrylate-co-methacrylic acid) or poly(t-butylstyrene-co-lithium methacrylate).

Other useful charge control agents include magnesium and heavier metal soaps of fatty and aromatic acids as described in Beyer, U.S. Pat. No. 3,417,019, issued Dec. 17, 1968. Useful metal soaps include cobalt naphthenate magnesium naphthenate and manganese naphthenate, zinc resinate, calcium naphthenate, zinc linoleate, aluminum resinate, isopropyltitanium stearate, aluminum stearate, and others many of which are also described in Matkan, U.S. Pat. No. 3,259,581, issued July 5, 1966. Typically, the amount of such materials used is less than about 2% by weight based on the weight of toner. In certain instances, the resinous binder per se can function as the charge control agent as can the colorant. A dispersing aid can also be added as shown, for example, in York, U.S. Pat. No. 3,135,695, issued June 2, 1964.

Various polymeric binder materials such as various natural, semi-synthetic or synthetic resins, may be dispersed or dissolved in the electrically insulating carrier portion of the electrically photosensitive material to serve as a fixing material for the final photoelectrophoretic image. The use of such fixing addenda is well known in the art of liquid electrographic developer compositions so that extended discussion thereof is unnecessary herein.

Imaging elements comprising layers of the electrically photosensitive material of this invention are made according to well known techniques. The elements may be formed simply by admixing the components of the photosensitive material in an electrically insulating liquid or liquefied carrier and coating the resulting suspension or dispersion on a support according to well known coating techniques. The support can be insulating or conductive, depending on the desired use. Useful supports and coating techniques are described throughout the literature of electrophotography and photoelectrophoretic imaging. Hence, extended discussion of the preparation of such elements will not be presented herein.

The electrically photosensitive material of this invention comprising Formula I pigments can be used to form monochrome images. Or the material may comprise an admixture of (1) one or more Formula I pigments and/or (2) other electrically photosensitive addenda of proper color and photosensitivity and used to form neutral or polychrome images.

As stated before, useful electrographic developers comprising toner particles containing Formula I pigments are also provided by the present invention.

The toner particles have an average diameter between about 0.1 micron and about 100 microns, although present day office copier devices using dry developers, typically employ particles having an average diameter between about 1.0 and 30 microns. Copiers using liquid developers employ particles having an average diameter of 0.01–5 microns. However, larger particles or smaller particles can be used where desired for particular methods of development or particular development conditions. For example, in powder cloud development such as described in U.S. Pat. No. 2,691,345, issued Oct. 12, 1954, extremely small toner particles on the order of about 0.01 microns may be used.

Toner particles comprising Formula I pigments can be prepared by a variety of known methods such as melt-blending. The melt-blending method involves melting a powdered form of a resin or binder polymer and mixing it with a Formula I pigment of the present invention and other necessary or desirable addenda. The resin can readily be melted on heated compounding rolls which are also useful to stir or otherwise blend the resin and addenda so as to promote the complete intermixing of these various ingredients. After thorough blending, the mixture is cooled and solidified. The resultant solid mass is then broken into small particles and finely ground to form a free-flowing powder of toner particles having the desired size. A wide variety of resins are described in the patent literature for use in forming electrographic toners. Many are disclosed for example, in the patents mentioned herein under the background of the present invention.

Other modifying materials such as various long chain anionic or cationic surfactants, conductive materials, and magnetic materials may also be incorporated, if desired, in the toner particles of the invention. Still other toner additives which may be incorporated in the toner particles are materials such as those described in Jacknow et al. U.S. Pat. No. 3,577,345, issued May 4, 1971. Generally, if any of the various modifying materials described above are used in the toner particles of the invention, the total amount thereof (excluding the weight of colorants) should be less than about 30 weight percent of the total weight of the toner particle.

Useful developer compositions may also contain a liquid or dry carrier.

Dry developers may comprise from about 1 to about 30 percent by weight of particulate toner particles and from about 70 to about 99 percent by weight carrier particles. Generally, the carrier particles are larger than the toner particles although developers containing carriers and toners of the same relative size are known. Carrier particles used in cascade or magnetic brush development have an average particle size on the order of from about 30 to about 1200 microns, preferably 60–300 microns.

The developer compositions are used to develop charge patterns on substrates. The development of charge patterns can be carried out by a number of well-known methods. The charge pattern is carried on a substrate such as an electrophotographic element or a dielectric element. Suitable dry development processes include, for example, cascade described in detail in U.S. Pat. Nos. 2,618,551; 2,618,552; and 2,638,416 and magnetic brush as described in U.S. Pat. No. 3,003,462.

The toners of the present invention can also be combined with an electrically insulating liquid carrier for liquid developers. Such liquid carriers and methods of forming liquid developers are well known from, for example, U.S. Pat. No. 3,770,638.

The following examples will further illustrate the utility of Formula I pigments in photoelectrophoretic imaging processes and electrographic developers.

EXAMPLES 1–7

Eight different toner compositions were prepared. Seven of the compositions included a different pigment from Table I. An eighth composition comprising copper phthalocyanine was prepared for comparison purposes.

The toner compositions were prepared by milling each pigment in methylene chloride ($CH_2Cl_2$) with steel shot for several days to a particle size of 0.1–0.3 micron. The pigment-$CH_2Cl_2$ mixture was then compounded into a styrene-acrylic polymeric binder on a two-roll rubber mill. During this step, $CH_2Cl_2$ evaporated. The resulting toner was then ground to a particle size of 5–15 microns on a fluid energy mill. The toner was coated on a receiver sheet to a reflection density of one.

Figure 2:
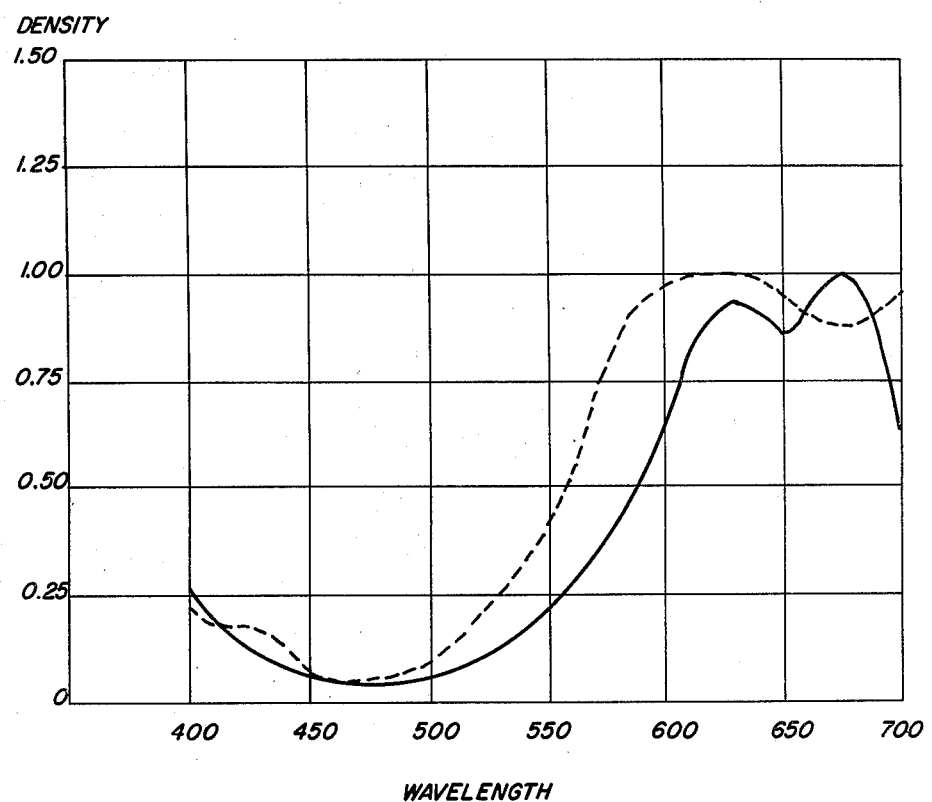
Figure 3:
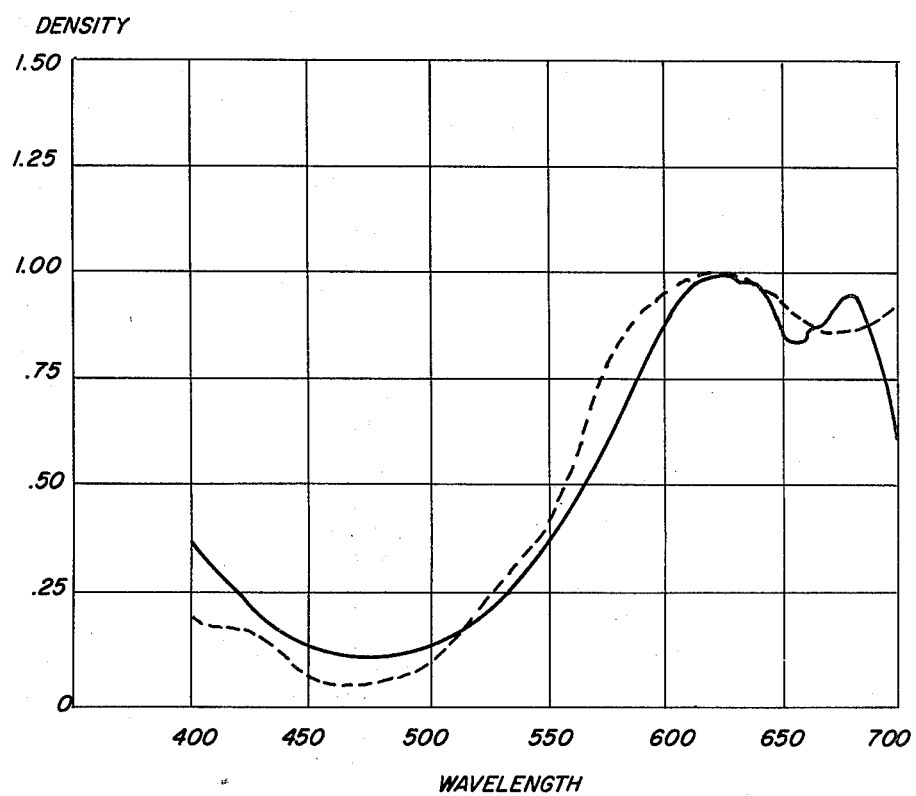

Spectral curves were obtained on a G.E. recording spectrophotometer. FIGS. 1, 2 and 3 show the improved spectral absorption of Pigments 1, 2 and 7 compared to the absorption spectrum of copper phthalocyanine.

Each toner composition comprising a Table I colorant exhibited a bathochromic shift and provided an excellent cyan hue. More specifically, the toner comprising copper phthalocyanine exhibited significantly more light absorption in the green region of the absorption spectrum (about 500–600 nm) than the toners containing Pigments 1, 2 and 7 of Table I. Absorption curves for each of the other toner compositions of the present invention exhibited much less green absorption than copper phthalocyanine.

EXAMPLES 8–14

Seven different electrically photosensitive layers were prepared. Each layer contained a different pigment from Table I. The electrically photosensitive layers were formulated and imaged using the method and apparatus described in Columns 8–9 of U.S. Pat. No. 4,142,890. Each of the images exhibited a cyan coloration having less green absorption than a comparable image formed with a layer containing copper phthalocyanine. The cyan coloration of each image was entirely consistent with the results illustrated in FIGS. 1, 2 and 3.

EXAMPLES 15–21

Color stability tests were performed on seven different toner compositions prepared as in Example 1. Each toner composition contained about 3 percent by weight of a different pigment from Table I. A control toner containing copper phthalocyanine was also prepared. Each composition was coated on a support and subjected to 50,000 lux (high intensity daylight) for seven days. This amount of exposure (50,000 lux) is equivalent to 280 days of exposure, assuming 12 hours of constant sunlight of 2,500 lux per day. The percent fade in color for each colorant is presented below in Table II.

TABLE II

| Pigment | |
|---|---|
| Copper phthalocyanine | 2–3% |
| 1 | 3–4% |
| 2 | 10% |
| 3 | 6% |
| 4 | 7% |
| 5 | 6% |
| 6 | 10% |
| 7 | 10% |

Copper phthalocyanine is generally regarded as having excellent stability. Table II shows that Pigment 1 of this invention possesses stability comparable to copper phthalocyanine. The other colorants also show good color stability.

The invention has been described in detail with particular reference to preferred embodiments thereof, but it will be understood that variations and modifications can be effected within the spirit and scope of the invention.

What is claimed is:

1. An electrically photosensitive material comprising an electrically insulating carrier and an electrically photosensitive phthalocyanine pigment of the structure:

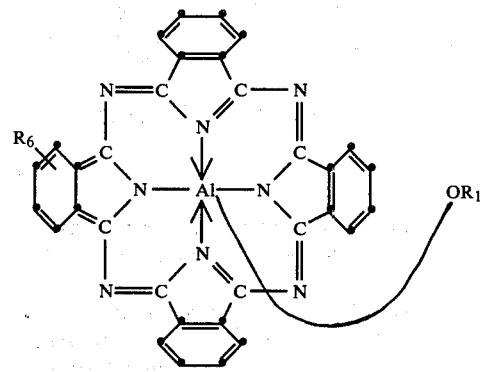

I.

wherein:
R₁ represents

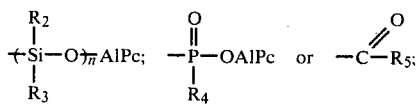

n represents 1, 2, 3 or any combination of 1, 2 and 3
R₂, R₃, R₄ and R₅ represent alkyl, alkylaryl, alkoxy, alkoxyaryl, cycloalkyl, aryl, aralkyl or aryloxy;
R₆ represents hydrogen or chlorine and
AlPc represents

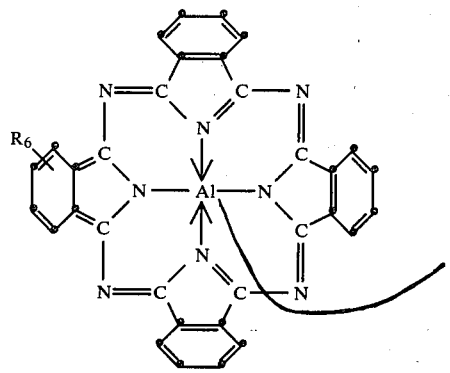

II.

2. A material as in claim 1, wherein said electrically photosensitive phthalocyanine pigment has a structure according to Formula I, wherein R₂, R₃, R₄ and R₅ represent phenyl, methoxyphenyl, methylphenyl, benzyl, cyclohexyl or methyl.

3. A material as in claim 1, wherein said electrically photosensitive phthalocyanine pigment has the structure:

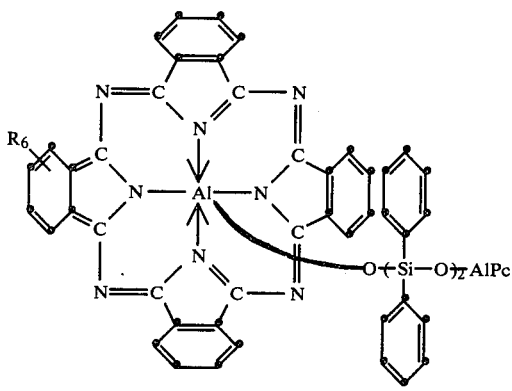

4. A material as in claims 1, 2 or 3, which also includes a charge control agent.

5. A photoelectrophoretic image recording method comprising the steps of:
   (a) placing an imaging element comprising a layer of an electrically photosensitive material in an electrical field; and
   (b) exposing said element to an image pattern of electromagnetic radiation to which said layer is photosensitive to form a record of the image pattern of electromagnetic radiation in said layer;

wherein said layer comprises an electrically photosensitive phthalocyanine pigment having the structure:

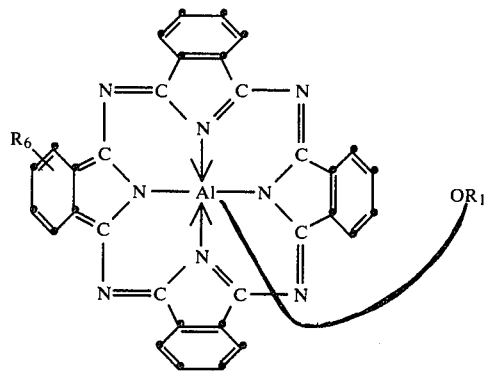

I.

wherein:
R₁ represents

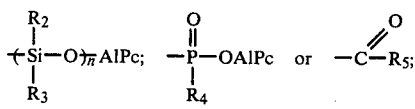

n represents 1, 2, 3 or any combination of 1, 2 and 3
R₂, R₃, R₄ and R₅ represent alkyl, alkylaryl, alkoxy, alkoxyaryl, cycloalkyl, aryl, aralkyl or aryloxy;
R₆ represents hydrogen or chlorine and
AlPc represents

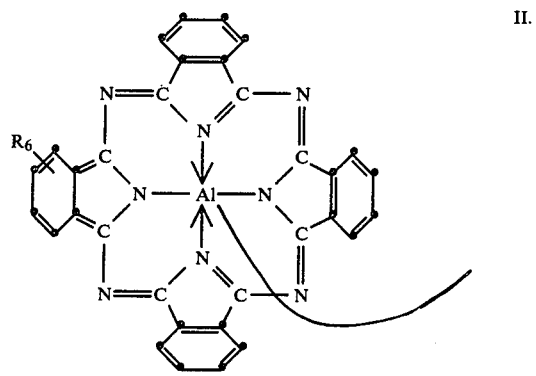

II.

6. A method as in claim 5, further comprising the steps of:
   (a) placing said element between two electrodes during the exposure and application of the electric field and then
   (b) separating the electrodes thereby forming a visual record of the image pattern of electromagnetic radiation on at least one of the electrodes.

7. A method as in claim 5, further comprising the steps of:
   (a) placing said layer between two support sheets to form the imaging element;
   (b) positioning the element between two electrodes during the exposure and application of the electric field; and
   (c) separating the two support sheets thereby forming a visual record of the image pattern of electromagnetic record on the support sheets.

8. A method as in claim 5, further comprising the step of developing a visual record of the image pattern of electromagnetic radiation by removing the exposed or unexposed portion of said layer.

9. A method as in claims 5, 6 or 7 wherein said electrically photosensitive phthalocyanine pigment has the structure:

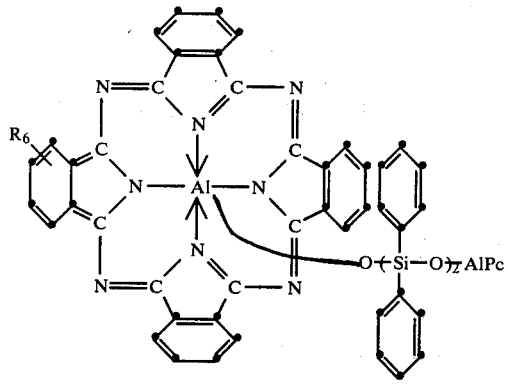

10. An imaging element comprising a layer of an electrically photosensitive material which comprises an electrically photosensitive phthalocyanine pigment of the structure:

I.

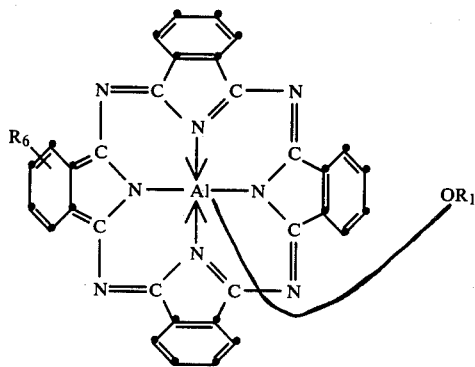

wherein:

R₁ represents

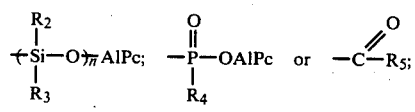

n represents 1, 2, 3 or any combination of 1, 2 and 3

R₂, R₃, R₄ and R₅ represent alkyl, alkylaryl, alkoxy, alkoxyaryl, cycloalkyl, aryl, aralkyl or aryloxy;

R₆ represents hydrogen or chlorine and

AlPc represents

II.

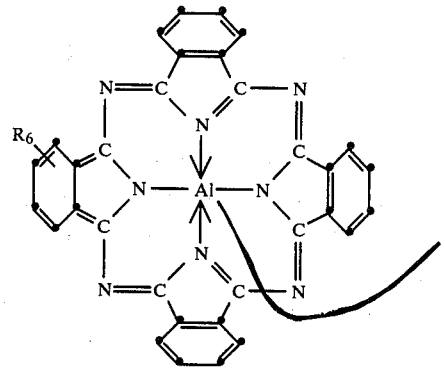

11. An element as in claim 10 wherein the layer is carried on a support.

12. An element as in claim 10 wherein the layer is situated between two support sheets.

13. An element as in claim 10 wherein at least one support sheet is transparent to activating electromagnetic radiation.

14. An element as in claims 12 and 13, wherein said electrically photosensitive phthalocyanine pigment has the structure:

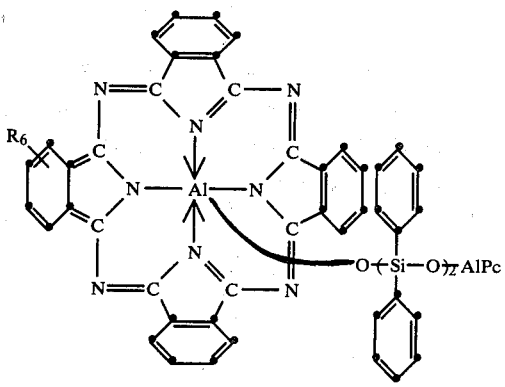

15. An electrographic developer composition comprising a toner which contains a resin and a phthalocyanine pigment having the structure:

I.

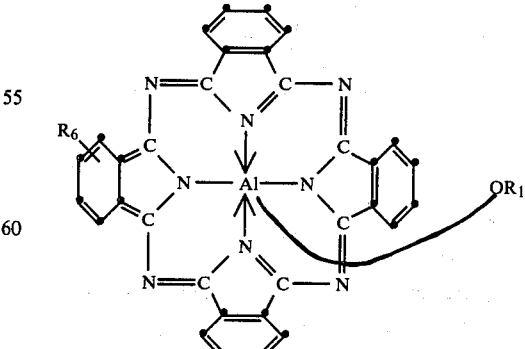

wherein:

R₁ represents

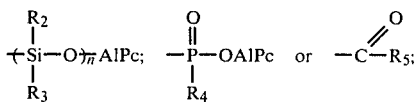

n represents 1, 2, 3 or any combination of 1, 2 and 3

$R_2$, $R_3$, $R_4$ and $R_5$ represent akyl, alkylaryl, alkoxy, alkoxyaryl, cycloalkyl, aryl, aralkyl or aryloxy;

$R_6$ represents hydrogen or chlorine and

AlPc represents

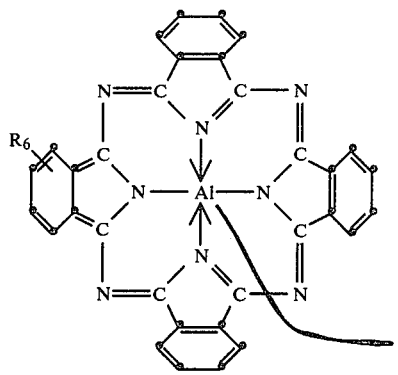

16. A developer composition as in claim 15, wherein said pigment has a structure according to Formula I wherein $R_2$, $R_3$, $R_4$ and $R_5$ represent phenyl, methoxyphenyl, methylphenyl, benzyl, cyclohexyl or methyl.

17. A developer composition as in claim 15, wherein said pigment has the structure:

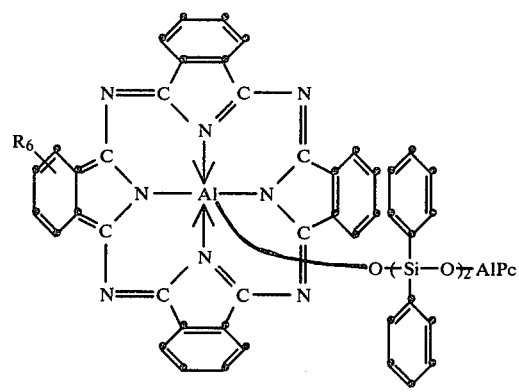

18. A developer composition as in claims 15, 16 or 17, which also includes a carrier.

19. In an electrographic process wherein a visible image is developed on a substrate by depositing toners on an electrostatic charge pattern on the substrate, the improvement wherein the toner comprises a phthalocyanine pigment having the structure:

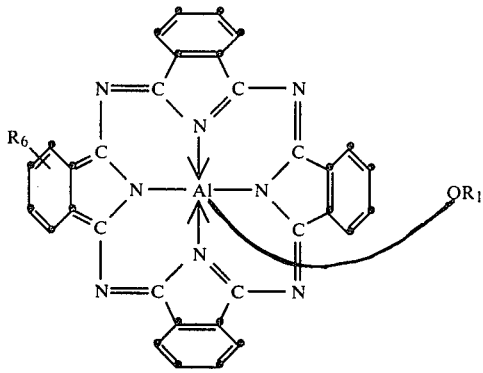

wherein:

$R_1$ represents

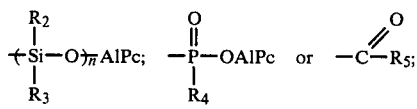

n represents 1, 2, 3 or any combination of 1, 2 and 3

$R_2$, $R_3$, $R_4$ and $R_5$ represent alkyl, alkylaryl, alkoxy, alkoxyaryl, cycloalkyl, aryl, aralkyl or aryloxy;

$R_6$ represents hydrogen or chlorine and

AlPc represents

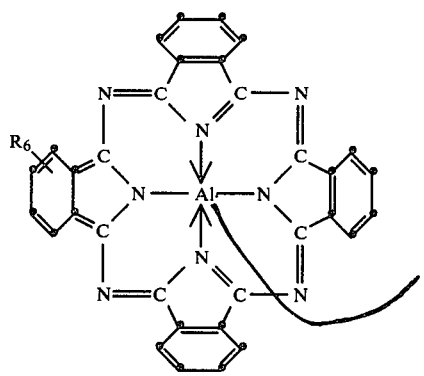

20. A process as in claim 19, wherein said pigment has a structure according to Formula I wherein $R_2$, $R_3$, $R_4$ and $R_5$ represent phenyl, methoxyphenyl, methylphenyl, benzyl, cyclohexyl or methyl.

21. A process as in claim 19, wherein said pigment has the structure:

22. An image comprising an electrically photosensitive pigment having the structure:
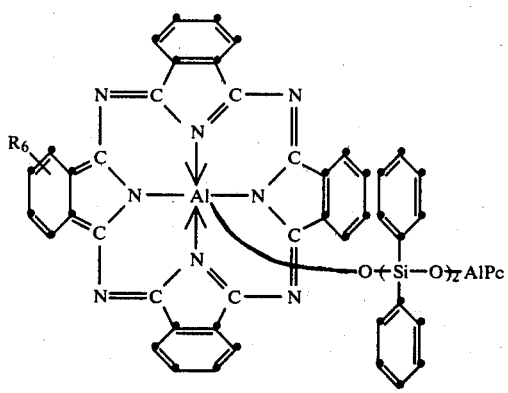
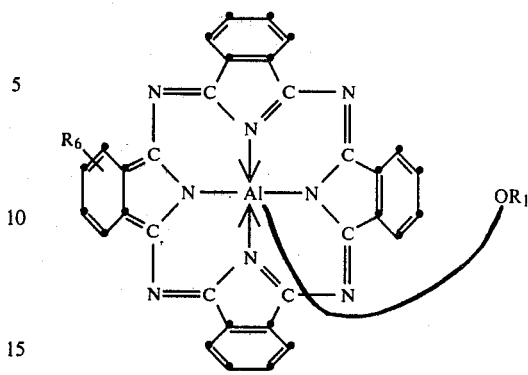
wherein:
R$_1$ represents
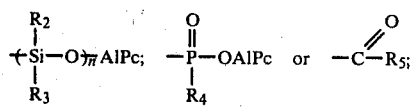
n represents 1, 2, 3 or any combination of 1, 2 and 3
R$_2$, R$_3$, R$_4$ and R$_5$ represent alkyl, alkylaryl, alkoxy, alkoxyaryl, cycloalkyl, aryl, aralkyl or aryloxy;
R$_6$ represents hydrogen or chlorine and
AlPc represents
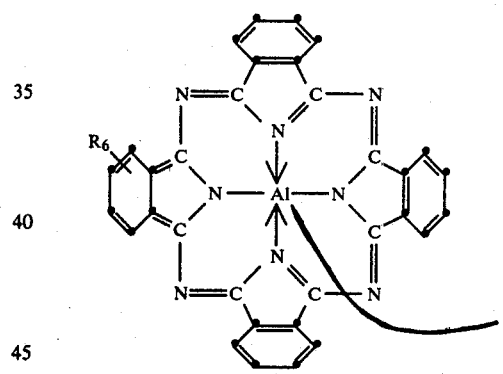
* * * * *

UNITED STATES PATENT AND TRADEMARK OFFICE
CERTIFICATE OF CORRECTION

PATENT NO. : 4,311,775

DATED : January 19, 1982

INVENTOR(S) : Michael T. Regan

Page 1 of 2

It is certified that error appears in the above-identified patent and that said Letters Patent are hereby corrected as shown below:

Title page, column 2, line 1, the formula set forth as:

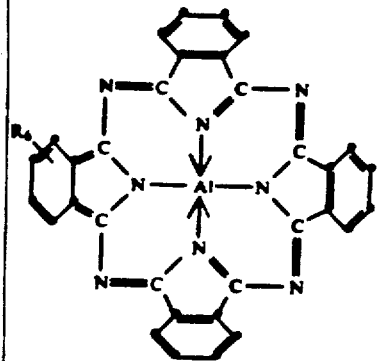 should read 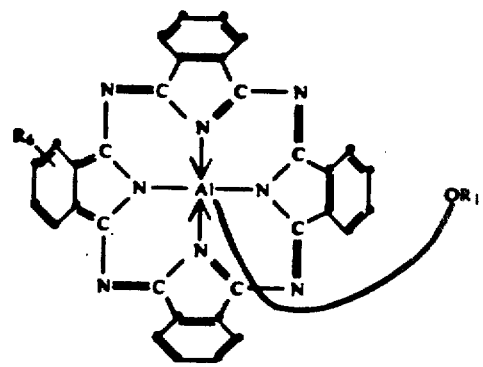

line 10, the formula set forth as:

UNITED STATES PATENT AND TRADEMARK OFFICE
CERTIFICATE OF CORRECTION

PATENT NO. : 4,311,775
DATED : January 19, 1982
INVENTOR(S) : Michael T. Regan

It is certified that error appears in the above-identified patent and that said Letters Patent are hereby corrected as shown below

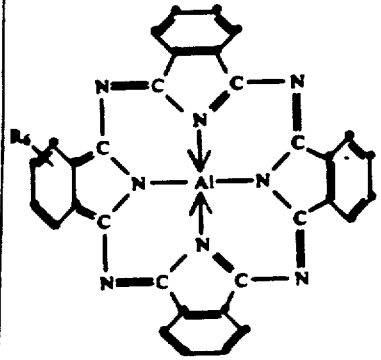 should read 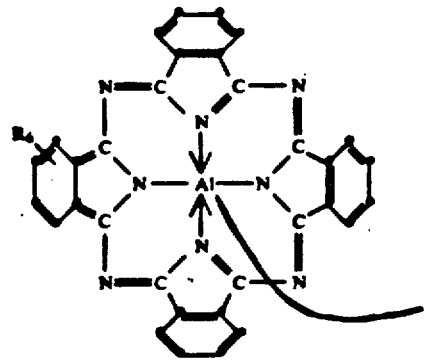

Column 6, line 48, "in" should read --is--.

Signed and Sealed this

Twenty-second Day of June 1982

[SEAL]

Attest:

*Attesting Officer*

GERALD J. MOSSINGHOFF
*Commissioner of Patents and Trademarks*